United States Patent [19]

Nagasaki et al.

[11] 4,158,000
[45] Jun. 12, 1979

[54] ANTIDEGRADANTS FOR RUBBER

[75] Inventors: Hideo Nagasaki, Osaka; Takashi Kojima, Toyonaka; Yoshinori Shiro, Ibaraki, all of Japan

[73] Assignee: Sumitomo Chemical Company, Limited, Japan

[21] Appl. No.: 906,565

[22] Filed: May 16, 1978

[30] Foreign Application Priority Data

May 25, 1977 [JP] Japan .................................. 52/61557

[51] Int. Cl.$^2$ ................................................ C08K 5/34
[52] U.S. Cl. ...................... 260/45.8 NW; 260/45.8 N; 260/800; 526/259; 546/181; 546/167
[58] Field of Search .................. 260/45.8 NW, 283 R, 260/800; 526/259

[56] References Cited

U.S. PATENT DOCUMENTS

| | | | |
|---|---|---|---|
| 2,064,752 | 12/1936 | Ingram | 260/800 |
| 2,095,126 | 10/1937 | Craig | 260/283 SY |
| 2,100,998 | 11/1937 | Sibley | 260/800 |
| 2,290,561 | 7/1942 | Ingram | 260/800 |
| 3,083,181 | 3/1963 | Harris | 260/45.8 NW |
| 3,244,683 | 4/1966 | Kline | 260/800 |
| 3,554,959 | 1/1971 | Hammersley et al. | 260/45.8 NW |
| 3,620,824 | 11/1971 | Slade et al. | 260/45.8 NW |
| 3,842,034 | 10/1974 | Fujimori et al. | 260/800 |

OTHER PUBLICATIONS

Craig, J.A.C.S., vol. 60, No. 6, 1938, pp. 1458 and 1459.

*Primary Examiner*—Hosea E. Taylor
*Assistant Examiner*—R. A. White
*Attorney, Agent, or Firm*—Wenderoth, Lind & Ponack

[57] ABSTRACT

Antidegradants for rubber comprising a mixture consisting essentially of 2,2,4-trimethyl-1,2-dihydroquinoline monomer, dimer thereof and more highly polymerized products than the said dimer, the contents of the said quinoline monomer and the said quinoline dimer being less than 5% by weight and 25% by weight or more, respectively. The antidegradants for rubber are very useful for preventing both heat ageing and flex cracking of rubber.

3 Claims, No Drawings

ANTIDEGRADANTS FOR RUBBER

The present invention relates to antidegradants for rubber, and more particularly it relates to antidegradants for rubber having excellent effects to prevent natural or synthetic rubbers from flex cracking and heat ageing.

In general, natural or synthetic rubber products have such properties that they produce cracks by repeated flexing and finally they become unsuitable for use owing to the growth of the cracks, or degradation by heat.

Hitherto, various attempts have been made to prevent such flex cracking and heat ageing, and many of them have proposed to use phenyl-$\beta$-naphthylamine or diphenylamine derivatives as antidegradants effective against flex cracking and heat ageing of rubber.

With these antidegradants, however, satisfactory performance has not yet been obtained. In recent years, particularly, there have been increasing demands for improvement in the flex cracking resistance and heat ageing resistance of rubber compounds with increasing tendencies towards the production of radial tire and belt for a high-speed belt conveyer. For this reason, there have also been strong demands for development of antidegradants having excellent performance in prevention of flex cracking and heat ageing.

On the other hand, 2,2,4-trimethyl-1,2-dihydroquinoline polymer mixture, which are a so-called dihydroquinoline polymer, produced by reaction between aniline and acetones, are widely used for heat ageing resistance, since they are not only very superior in preventing heat ageing but are also economical and have stable availability. As to the composition of antidegradants now on the market as the so-called dihydroquinoline polymer, the following are known by gas-chromatography (internal standard method); the main component is a mixture of 2,2,4-trimethyl-1,2-dihydroquinoline trimer and more highly polymerized products than the trimer, and in addition thereto, large amounts of impurities having no dihydroquinoline structure are contained. Since, however, the commercial antidegradant, the dihydroquinoline polymer, has little or no effect to prevent flex cracking, it is at present necessary to use another flex cracking inhibitor in combination in order to prevent both flex cracking and heat ageing. Besides, the antidegradant causes various practical problems, for example they are so much poor in compatibility with rubbers that troubles are caused in rubber processing.

In order to overcome these problems, the inventors extensively studied to develop antidegradants having excellent effect to prevent both flex cracking and heat ageing which are now most strongly demanded in the rubber industry.

As a result, it was found that, of various polymers resulting from 2,2,4-trimethyl-1,2-dihydroquinoline, the dimer alone shows a remarkably superior ability to prevent flex cracking, particularly at high temperatures, and improves resistance to heat ageing, and moreover that the dimer has excellent compatibility with rubbers. As a result of further investigation, the inventors found that, to say nothing of the excellent performance of the dimer itself, even mixtures comprising the said dimer, the said dihydroquinoline monomer and more highly polymerized products than the said dimer display excellent ability, as antidegradants for rubber, to prevent both heat ageing and flex cracking, when the dimer content of the mixtures is 25% by weight or more.

The present invention provides an antidegradant for rubber comprising a mixture consisting essentially of 2,2,4-trimethyl-1,2-dihydroquinoline monomer (referred to as "quinoline monomer" hereinafter), dimer thereof (referred to as "quinoline dimer" hereinafter) and more highly polymerized products than the said dimer (referred to as "quinoline polymer" hereinafter), the contents of the said quinoline monomer and the said quinoline dimer being less than 5% by weight and 25% by weight or more, respectively, and also provides a method for preventing heat ageing and flex cracking of rubber at the same time by incorporating said antidegradant into rubber.

The method for production of the antidegradant of the present invention is not particularly limited. For example, they may be produced by reacting aniline and acetones (e.g. acetone, diacetone alcohol, mesityl oxide) in the presence of an acidic catalyst by usual methods [for example, D. Craig; J.A.C.S., 60, 1458 (1938)], under reaction conditions such as catalyst amount and reaction temperature adjusted so as to produce the said mixture containing at least 25% by weight of the quinoline dimer. Alternatively, they may be produced by properly mixing the quinoline dimer, the quinoline monomer and the quinoline polymer which are separately produced by usual methods in advance.

In the antidegradants of the present invention, the content of the quinoline dimer is at least 25% by weight, preferably at least 35% by weight, more preferably at least 50% by weight. Further, the quinoline dimer produced by removing the quinoline monomer and quinoline polymer from the reaction product described above is of course included in the present invention.

The antidegradants of the present invention are incorporated not only in natural rubbers but also in synthetic rubbers such as styrene/butadiene copolymer rubbers, acrylonitrile/butadiene copolymer rubbers, polybutadiene rubbers and polyisoprene rubbers by usual methods, for example using mixers such as mixing rolls and Banbury mixers. The amount of antidegradant incorporated is generally 0.1 to 7 parts by weight, preferably 0.2 to 4 parts by weight, based on 100 parts by weight of rubber.

In using the antidegradants for rubber of the present invention, other additives and antidegradants such as N-phenyl-N'-alkyl-p-phenylenediamines and N,N'-diaryl-p-phenylenediamines may be added.

As described above, the antidegradants for rubber of the present invention are superior not only in ability to prevent flex cracking but also in ability to prevent degradation by heat or oxidation. Particularly, they display very superior advantages by themselves, in usages requiring flex resistance and heat resistance at the same time, while two or more different kinds of antidegradants each having effects to prevent either flex cracking or heat ageing are conventionally used together for such usages. Further, the antidegradants of the present invention are so superior in compatibility with rubbers that they are very practical and suitable for multipurpose as antidegradants for rubber.

The present invention will be illustrated in detail with reference to the following examples, which are not however to be interpreted as limiting the present invention thereto. Parts are by weight.

EXAMPLE 1

A rubber compound comprising 100 parts of natural rubber, 45 parts of HAF carbon, 5 parts of zinc oxide, 2.5 parts of sulfur, 1 part of stearic acid, 5 parts of a process oil, 0.5 part of N-cyclohexylbenzothiazylsulfene amide (vulcanization accelerator) and 1 part of an antidegradant shown in Table 1 was milled as usual on a 6 inches $\phi$ mixing roll. The rubber sheet thus prepared was tested for tackiness. The same rubber compound was vulcanized at 140° C. for 30 minutes and the vulcanized rubber product was subjected to a heat ageing test and a flex cracking test.

Tackiness between rubbers was measured on a Tel-Tak meter (produced by Monsant Co.) using the test pieces which had been prepared by cutting the above mentioned rubber sheet in 5 mm. in width and ageing at 25° C. for 10 days. The heat ageing test was carried out according to JIS K 6301, i.e. by heat-ageing the test pieces at 100° C. for 24 hours in a test tube heat ageing tester, and then measuring physical properties of the resulting test pieces.

The flex cracking test was carried out as follows according to JIS K 6301: A hole of 2 mm. in length is vertically made through the test piece, and, after the required number of times of flexing, the length of crack is measured.

The same test was also applied to the test pieces which had been heat-aged at 100° C. for 24 hours in a Geer oven.

The results obtained are shown in Table 2. It is apparent from the table that the antidegradants of the present invention have a high tackiness and good compatibility with rubbers and further that they are very superior in heat ageing resistance and flex cracking resistance.

Table 1

| Experiment No. | Composition (weight %)* | | |
|---|---|---|---|
| | Quinoline dimer | Quinoline monomer | Other reaction products |
| Present example | 1 | 96 | 1 | 3 |
| | 2 | 76 | 2 | 22 |
| | 3 | 52 | 4 | 44 |
| | 4 | 42 | 2 | 56 |
| | 5 | 36 | 3 | 61 |
| | 6 | 28 | 4 | 68 |
| Comparative example | 7 | 18 | 1 | 81 |
| | 8 | 13 | 2 | 85 |
| | 9 | Phenyl-β-naphthylamine | | |
| | 10 | Condensation product of diphenylamine and acetone | | |

*The composition was measured under the following conditions according to the internal standard method of gas-chromatography:
Apparatus : GC-163 (produced by Hitachi Seisakusho Co.)
Column : Silicone OV-1 (Chromosorb W, AW, DMCS) 3mm $\phi$ × 1m
Temperature : Constant temperature vessel 110°–300° C. (10° C./min.) Inlet 300° C. Detector 300° C.
Detector : FID
Carrier gas : $N_2$(0.6 kg./cm²)
Internal standard substance : Di-n-butyl phthalate In this case, the retention time ratio of the quinoline dimer to di-n-butyl phthalate was 1.9 to 2.1 and that of the quinoline monomer to di-n-butyl phthalate was 0.2 to 0.3. The structures of the quinoline dimer and quinoline monomer were identified using a mass analysis apparatus and nuclear magnetic resonance absorption apparatus.

Table 2

| | Characteristics | Present example No. | | | | | | Comparative example No. | | | |
|---|---|---|---|---|---|---|---|---|---|---|---|
| | | 1 | 2 | 3 | 4 | 5 | 6 | 7 | 8 | 9 | 10 |
| Tackiness (ounce/ 5 × 5 mm²) | After 1 day | 70< | 70< | 70< | 70< | 70< | 70< | 70< | 70< | 70< | 70< |
| | After 3 days | " | " | " | " | " | " | 45 | 41 | " | " |
| | After 10 days | " | " | " | " | 64 | 58 | 22 | 17 | " | " |
| Heat ageing test | (Before heat ageing) | | | | | | | | | | |
| | Tensile strength (kg/cm²) | 265 | 268 | 265 | 265 | 264 | 263 | 264 | 263 | 260 | 261 |
| | Elongation (%) | 540 | 540 | 540 | 540 | 540 | 540 | 530 | 540 | 530 | 530 |
| | (After heat ageing) | | | | | | | | | | |
| | Tensile strength (kg/cm²) | 199 | 197 | 198 | 196 | 194 | 194 | 193 | 193 | 172 | 187 |
| | Elongation (%) | 430 | 420 | 420 | 420 | 410 | 410 | 400 | 400 | 380 | 390 |
| Flex cracking test | (Before heat ageing) Length of crack after 5000 bendings (mm) | 3.8 | 4.1 | 4.1 | 4.2 | 4.3 | 4.3 | 5.2 | 6.1 | 4.4 | 4.3 |
| | Length of crack after 10000 bendings (mm) | 4.4 | 4.7 | 4.8 | 4.8 | 4.9 | 5.0 | 6.3 | 7.1 | 5.1 | 5.3 |
| | (After heat ageing) Length of crack after 5000 bendings (mm) | 4.3 | 4.7 | 4.7 | 4.8 | 4.9 | 5.0 | 7.0 | 7.5 | 5.0 | 5.4 |
| | Length of crack after 10000 bendings (mm) | 5.2 | 6.0 | 6.1 | 6.2 | 6.2 | 6.3 | 9.3 | 9.8 | 6.4 | 7.0 |

EXAMPLE 2

A rubber compound comprising 100 parts of styrene/butadiene rubber, 50 parts of HAF carbon, 5 parts of a process oil, 5 parts of zinc oxide, 3 parts of stearic acid, 2.5 parts of sulfur, 1 part of N-cyclohexylbenzothiazylsulfene amide (vulcanization accelerator) and 1 part of an antidegradant shown in Table 1 was milled as usual on a 6 inches $\phi$ mixing roll and vulcanized at 145° C. for 30 minutes. Using the test pieces thus obtained, a flex cracking test was carried out in the same manner as in Example 1. The results obtained are shown in Table 3.

Table 3

| Experiment No. | Present example | | | | | | Comparative example | | | |
|---|---|---|---|---|---|---|---|---|---|---|
| | 1 | 2 | 3 | 4 | 5 | 6 | 7 | 8 | 9 | 10 |
| (Before heat ageing) | | | | | | | | | | |
| Length of crack after 3000 bendings (mm) | 4.8 | 5.0 | 5.1 | 5.2 | 5.2 | 5.3 | 5.7 | 6.8 | 5.3 | 5.3 |
| Length of crack after 5000 bendings (mm) | 8.0 | 8.3 | 8.4 | 8.5 | 8.6 | 8.6 | 9.9 | 10.2 | 9.0 | 9.0 |
| (After heat ageing) | | | | | | | | | | |
| Length of crack after 3000 bendings (mm) | 7.7 | 8.2 | 8.3 | 8.4 | 8.5 | 8.5 | 9.3 | 10.0 | 8.6 | 8.7 |
| Length of crack after 5000 bendings (mm) | 12.6 | 13.2 | 13.4 | 13.5 | 13.5 | 13.6 | 14.4 | 15.3 | 13.8 | 14.0 |

What is claimed is:

1. A method for preventing heat ageing and flex cracking of rubber at the same time, which comprises incorporating the antidegradant for rubber comprising a mixture consisting essentially of 2,2,4-trimethyl-1,2-dihydroquinoline monomer, dimer thereof and more highly polymerized products than the said dimer, the contents of the said quinoline monomer and the said quinoline dimer being less than 5% by weight and 25% by weight or more, respectively into said rubber.

2. A method according to claim 1, wherein the amount of the antidegradant incorporated is 0.1 to 7 parts by weight based on 100 parts by weight of rubber.

3. A method according to claim 1, wherein the said rubber includes natural rubbers, styrene/butadiene copolymer rubbers, acrylonitrile/butadiene copolymer rubbers, polybutadiene rubbers and polyisoprene rubbers.

* * * * *